United States Patent [19]

Eigenmann

[11] Patent Number: 5,052,257
[45] Date of Patent: Oct. 1, 1991

[54] MASS FORCES BALANCING APPARATUS IN A MACHINE HAVING A CRANK SHAFT DRIVE, SPECIFICALLY A PUNCHING MACHINE

[75] Inventor: Oskar Eigenmann, Arbon, Switzerland

[73] Assignee: Bruderer AG, Arbon, Switzerland

[21] Appl. No.: 512,735

[22] Filed: Apr. 20, 1990

[30] Foreign Application Priority Data

May 3, 1989 [CH] Switzerland ............ 1691/89

[51] Int. Cl.⁵ .................................. B30B 5/00
[52] U.S. Cl. ........................... 83/530; 83/615; 83/632; 74/603; 100/257
[58] Field of Search .......... 83/615, 530, 626, 634, 83/632, 625; 74/571 M, 603; 100/257, 282

[56] References Cited

U.S. PATENT DOCUMENTS 4,156,387  5/1979  Portmann ............... 83/615
4,757,734  7/1988  Portmann ............... 83/615

FOREIGN PATENT DOCUMENTS 2534626  3/1976  Fed. Rep. of Germany .
2095092  1/1972  France .
2158845  5/1973  France .
6908243  12/1970  Netherlands .
427442  12/1966  Switzerland .

Primary Examiner—Mark Rosenbaum
Assistant Examiner—Allan M. Schrock
Attorney, Agent, or Firm—Ladas & Parry

[57] ABSTRACT

The balancing weights are hingedly mounted at their lower ends to link rods. These link rods are hingedly mounted to an extended section of first rods. At opposite ends the balancing weights are hingedly mounted to reversing levers that in turn are hingedly mounted to second rods. The first rods and the second rods are supported on a common eccentric sleeve. Accordingly, the drive of the balancing weights does not come from structural members of the machine which are directly mounted to the ram. Accordingly, no mass forces and oscillations of the balancing weights and of the structures driving same can be transmitted onto the ram. Conclusively, the moving sequence of the ram and accordingly the cutting or embossing action is no longer influenced detrimentally such that the quality of a respective product produced is improved.

4 Claims, 5 Drawing Sheets

MASS FORCES BALANCING APPARATUS IN A MACHINE HAVING A CRANK SHAFT DRIVE, SPECIFICALLY A PUNCHING MACHINE

BACKGROUND OF THE INVENTION

1. FIELD OF THE INVENTION

The present invention relates to an apparatus for balancing mass forces in a machine having a rod and crank shaft drive and, specifically, a punching machine.

2. DESCRIPTION OF THE PRIOR ART

The balancing weights of known punching machines are usually pivotally mounted to a frame of the machine. One or several link rods act between a drive crank shaft and the punch or ram of the machine to transmit operational forces and movements to the ram. The link rods can also act as reversing levers, if pivotally supported on the machine frame, to reverse the direction of these movements for balancingly oscillating the balancing weights. Quite obviously, mass forces and vibrations occur in all the structural members for such balancing, and these are transmitted onto the ram of the machine. Such influences are, however, so detrimental to the movement of the punch or ram for its punching (cutting) or embossing procedure that the quality of the product of the punching machine (press) may be diminished.

SUMMARY OF THE INVENTION

It is, accordingly, a general object of the invention to provide a mass forces balancing apparatus for a punching machine having a reciprocating punch or ram in which, in order to balance the mass forces that are perpendicular to the direction of the reciprocating stroke of the ram, the balancing weights are pivotally mounted at their opposite ends to respective rods and levers that are oscillated by respective first and second rods on opposite sides of a drive crank shaft. Also, other, reversing levers oscillate the ram from the first rods so that the balancing weights and ram are driven independently of each other from a common eccentric sleeve on the drive crank shaft.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
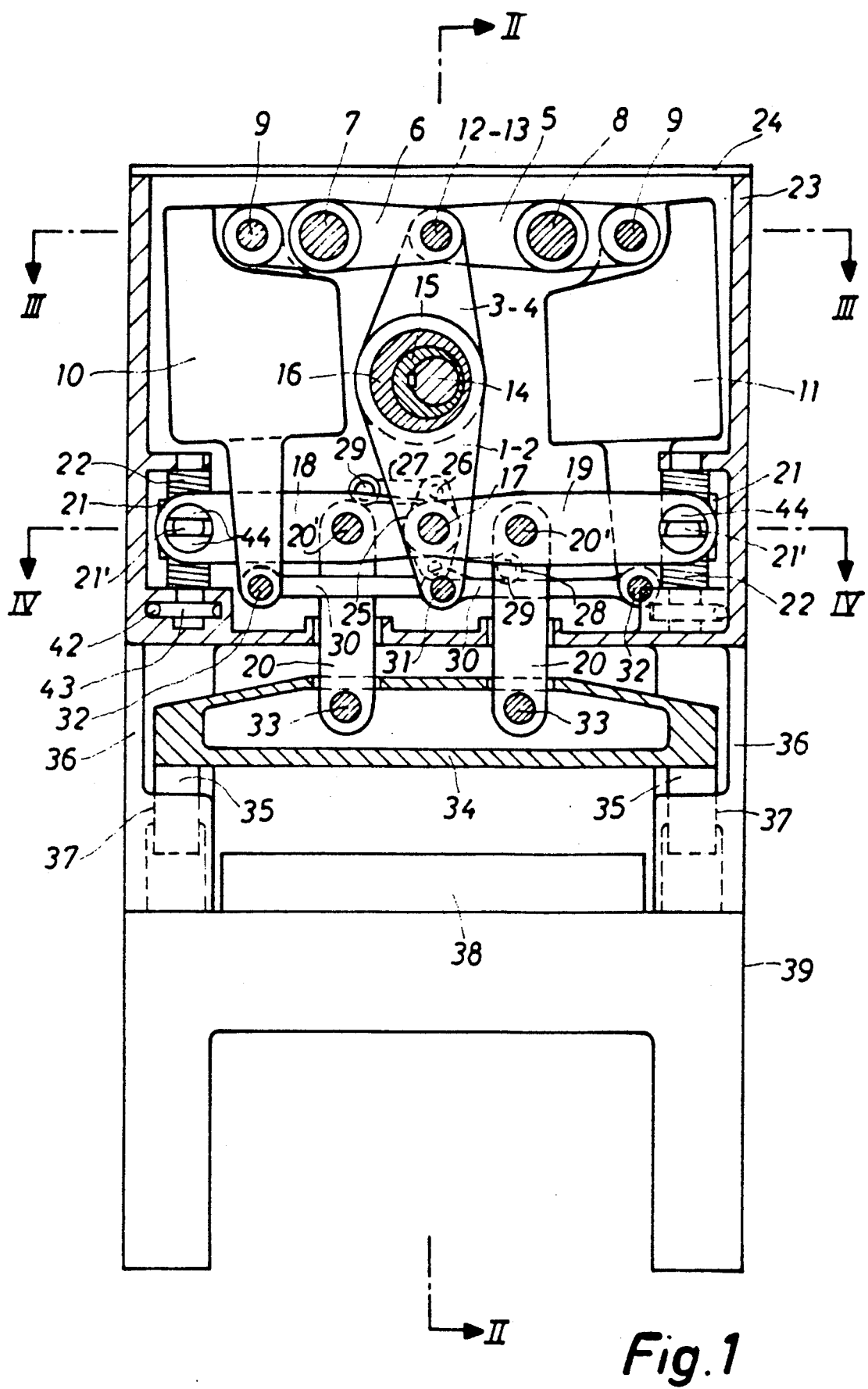
FIG. 1 is a front elevation in longitudinal section of a punching machine having a mass force balancing apparatus structured in accordance with the present invention.
Figure 2:
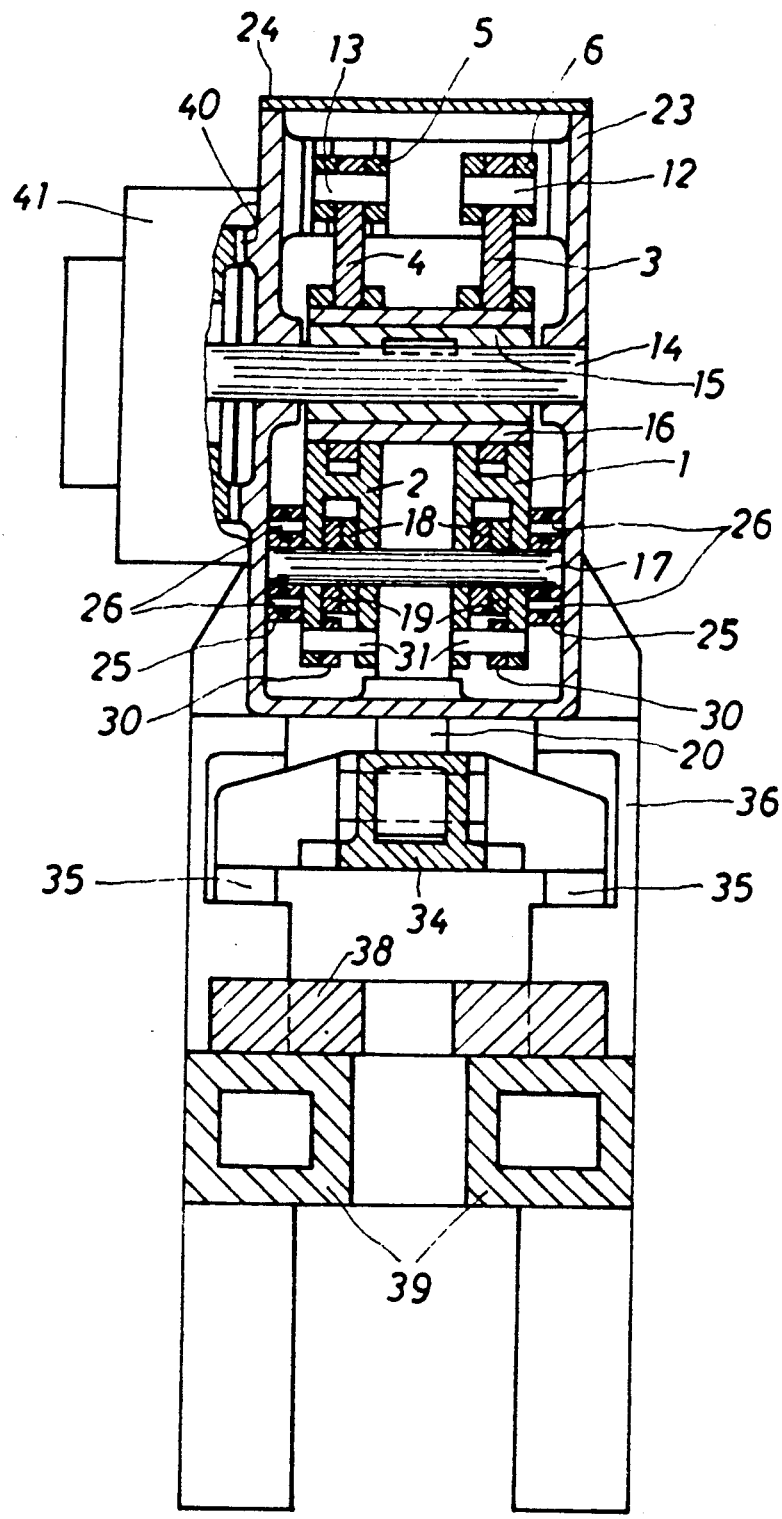
FIG. 2 is a side elevation, partly in section along line II—II of FIG. 1 and partly broken away, of the machine of FIG. 1.
Figure 3:
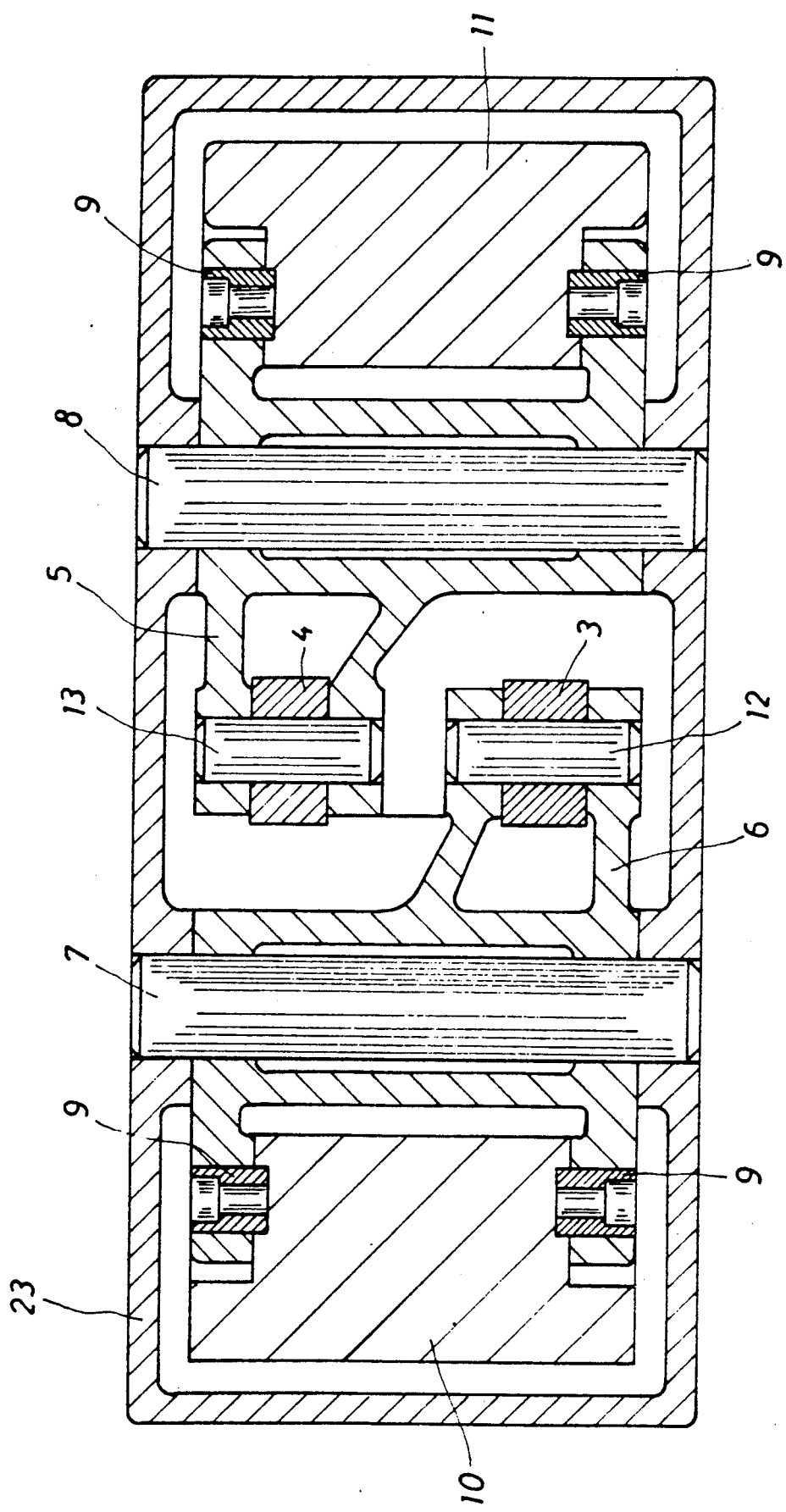
FIG. 3 is a top view of the machine of FIG. 1 in section along line III—III of FIG. 1 and on an enlarged scale.

A crank shaft 14 of a punch press or machine as illustrated in FIGS. 1 and 2 is supported at its opposite ends in a frame 23 of the machine. This crank shaft 14 is rotationally driven, for instance via a generally known coupling/brake apparatus of which only the brake disk 40 and casing 41 are illustrated in FIG. 2 (A fly wheel and the coupling of the punch press may also be located in the casing 41.)

An eccentric sleeve 15 is on the crank shaft 14 and surrounded by another eccentric sleeve 16 for adjusting the stroke of the machine. The eccentric sleeve 16 rotates in one end of rods 1, 2 that extend downwardly therefrom. The opposite ends of rods 1, 2 are linked for driving a punch or ram 34 of the machine. These rods are termed hereinafter as first rods 1, 2.

Figure 4:
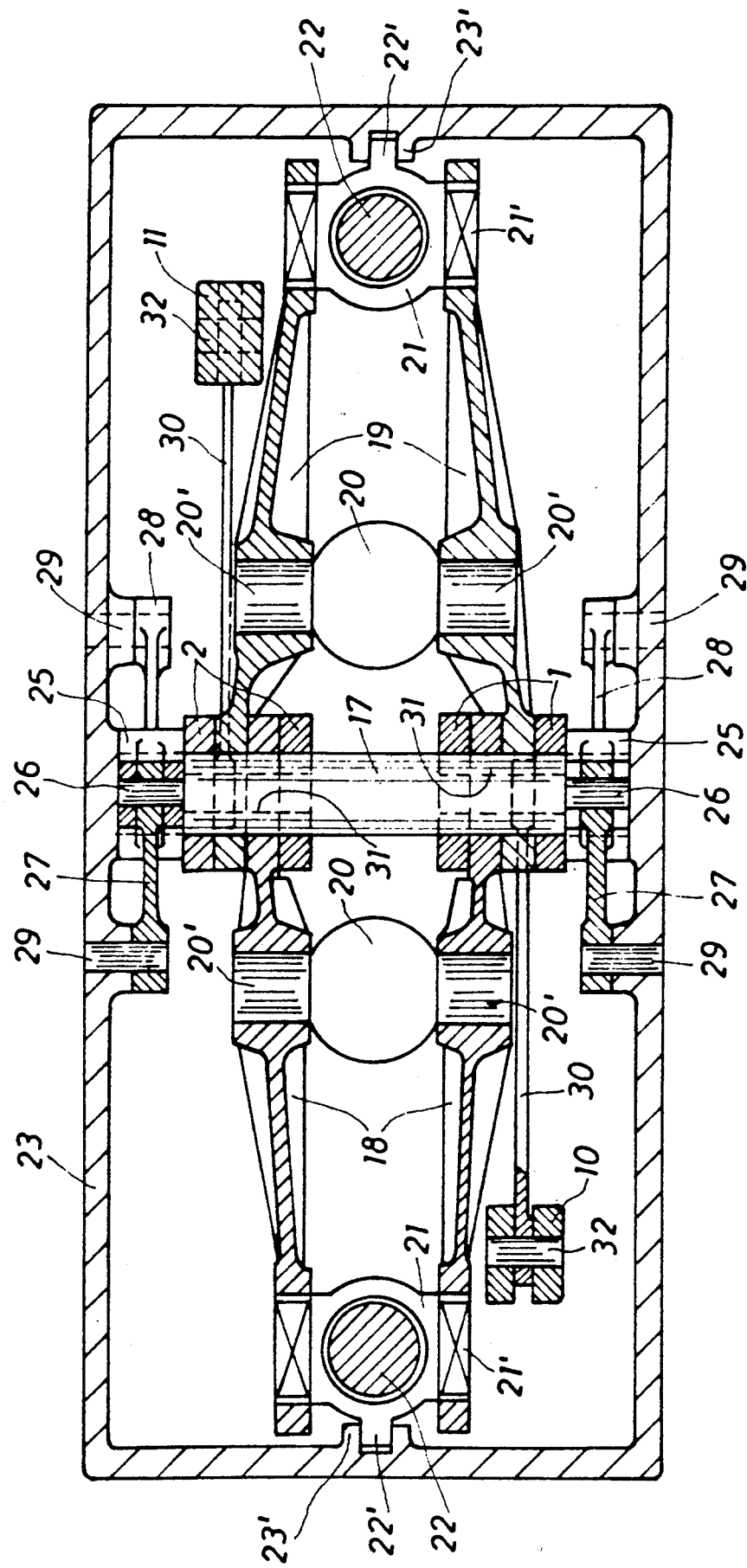
FIG. 4 is a top view of the machine of FIG. 1 in section along line IV—IV of FIG. 1 and on an enlarged scale.

The linkage of the first rods 1, 2 for transmitting their movements to the ram is via a parallel-guided journal pin 17, which will be described in detail later on, and pairs of single arm levers 18, 19. The single arm levers 18, 19 are supported at one end on the journal pin 17 and at their opposite ends remote from the journal pin 17 via threaded spindles 22 on the machine frame 23. For the latter, spindle nuts 21 having bearing lugs 21' are screwed onto the threaded spindles 22. The bearing lugs 21' project between bearing segments 44 in the opposite ends of the respective levers 18, 19 such that these levers 18, 19 are supported at these ends pivotally and longitudinally movably relative to the threaded spindles 22. Projections 22' of the respective spindle nuts 21 are illustrated in FIG. 4 and project between projections 23' of the machine frame 23 such that the spindle nut 21 is prevented from rotating on the threaded spindle 22, but longitudinally adjustable in the direction of the height of the machine. The threaded spindles 22 can be rotated by commonly known synchronously driven worm gearings 42, 43 (FIG. 1), whereby the spindle nuts 21 are moved linearly.

The resulting, adjusted location of the spindle nuts 21 determines the position of the ram 34 relative to the tool clamping plate 38. At a location between the one end of the levers 18, 19 at the journal pin 17 and their opposite ends at the threaded spindles 22, one end of the respective pressing rods 20 is pivotally mounted to the levers 18, 19 via bearing bolts 20. At their opposite ends, the pressing rods 20 are pivotally mounted via journals 32 to the ram 34.

An interstice between the ram 34 and a tool clamping plate 38 is accessible between supporting columns 36 of the machine frame 23 for receiving a workpiece and tool in the known manner. The supporting columns 36 merely connect an upper part of the machine frame 23 with a lower part 39 of the machine frame. The ram 34, however, includes guide columns 35 that are parallel to and adjacent the supporting columns 36. These are guided in guides 37 of the machine frame 23 so that the ram 34 is transversely restricted or guided in its horizontal plane.

Thus, upon rotation of the crank shaft 14, the eccentric sleeves 15, 16 produce vertical movement, i e. movement parallel to the support columns 36, of the first rods 1, 2. The first rods 1, 2 correspondingly move the single arm levers 18, 19. The single arm levers decrease the vertical movement in accordance with their leverage to the pressing rods 20, and the pressing rods transmit this decreased vertical movement to the ram 34.

Figure 5:
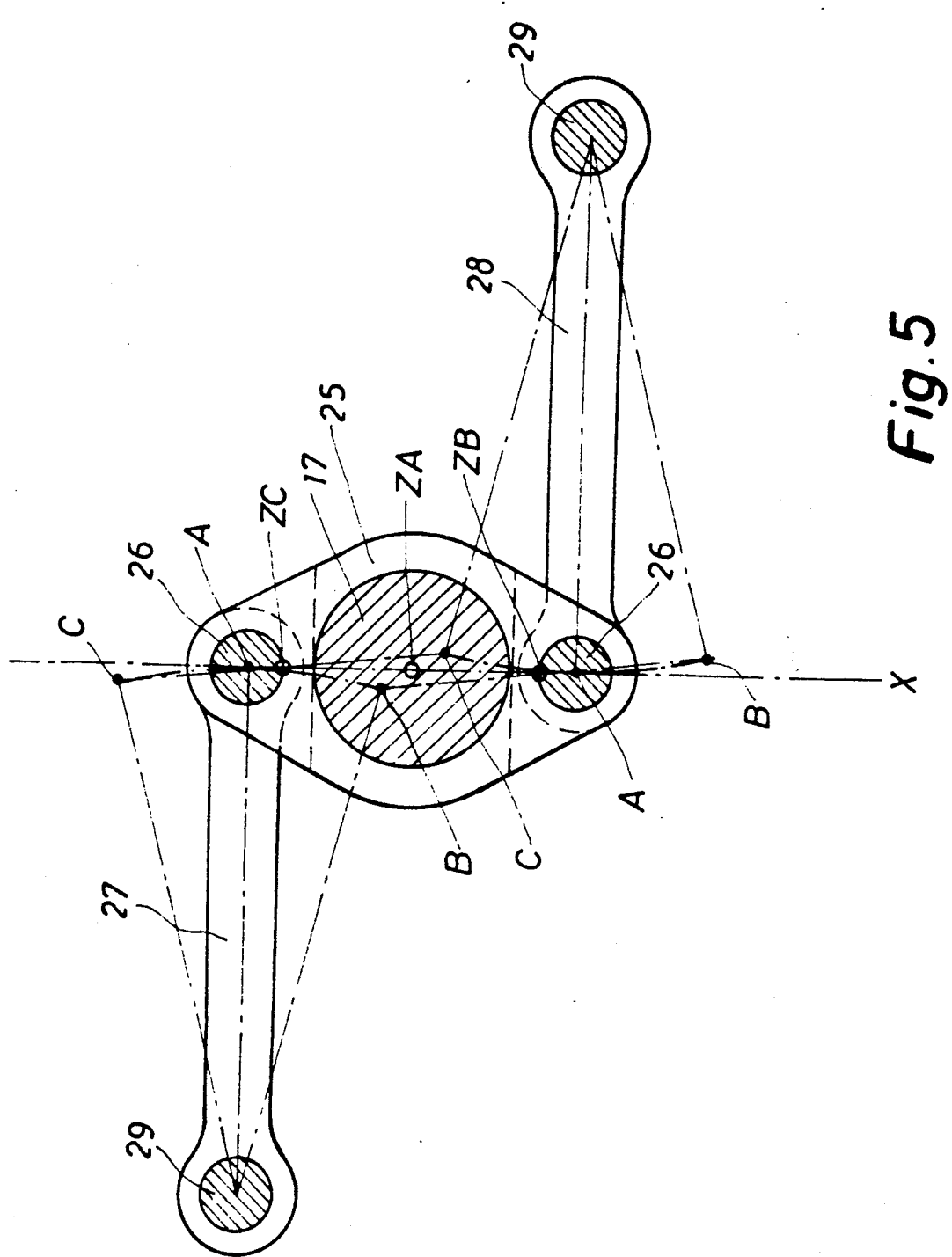
FIG. 5 is an enlarged front view, partly in section, of a journal pin portion of the machine of FIG. 1.

The above-mentioned parallel guiding of the journal pin 17 is not brought about merely by a sliding guide structure, but rather by the apparatus illustrated in FIG. 5 on an enlarged scale, and also illustrated in FIGS. 1, 2 and 4. In it, respective reversing levers 25 are placed opposite ends of the journal pin 17. Each reversing lever 25 is pivotally mounted at its opposite ends via pins 26 to one end of link rods 27, 28. The opposite ends of the link rods 27, 28 are, in turn, pivotally supported on bolts 29, which are stationarily fixed in the machine frame 23.

FIG. 5 illustrates the center position of these structural members, whereby ZA identifies the center position of the longitudinal axis of the journal pin 17, and A identifies the center position of the pivot axes of the pins 26 of the link rods 27, 28 to the reversing lever 25. When the journal pin then moves vertically upwards, as before described, its axis ZA moves upwards along the straight line X to position ZC, but the axes of the pins 26 move from position A along sections of circular lines upwards to positions C. Similarly, during opposite, downwards movement, the axes of the pins 26 move circularly into positions B while the longitudinal axis of the journal pin 17 moves into position ZB. This produces at least substantially vertical or parallel-guided shifting of the axis of the journal pin 17 over the entire range of vertical movement or stroke of the punch press.

Returning again to FIG. the drive of balancing weight 10, 11 will now be explained. One end of second rods 3, 4 is also supported on the eccentric sleeve 16. For this, the first rods 1, 2 are forked, as illustrated in FIG. 2 so that the second rods 3, 4 can respectively project from between the legs of the forks of the first rods 1, 2. This also stabilizes the first and second rods on the eccentric sleeve 16. The second rods 3, 4 extend upwards, towards a cover 24 of the machine frame and opposite ends that are each pivotally mounted via bolts 12, 13 to one end of reversing levers 5, 6. Between their ends, the reversing levers 5, 6 are pivotally supported on the frame 23 of the machine via shafts 7, 8. The opposite ends of the reversing levers 5, 6, remote from the bolts 12, 13, are hingedly mounted via respective bolts 9 to one, top end of the balancing weights 10, 11. It is now obvious that the structural members described above cause oscillating movements and mass forces of the balancing weights 10, 11 that balance opposite movements and mass forces (directed vertically) of the ram 34.

Further link rods 30 are hingedly mounted at one end to the opposite end of the balancing weights 10, 11 via bolts 32. The opposite ends of the link rods 30 are, in turn, pivotally mounted via respective bolts 31 (see also FIG. 2) to the first rods 1, 2. It is to be noted that, accordingly, the link rods 30 are hingedly mounted to the first rods 1, 2 at a location that is opposite the crank shaft 14 relative to the pivotal point (journal pin 17) of the single arm levers 18, 19. For this, the first rods 1, 2 extend beyond the point of support of the journal pin 17. Accordingly, the lateral movements of the rotating masses of the eccentric sleeves 15, 16 as well as the corresponding lateral movements of the rods 1-4 are balanced by the reversed or opposite movements of the balancing weights 10, 11.

Further, because the second rods 3, 4 and link rods 30 that move the balancing weights 10, 11 are separate from the structural members (levers 18, 19 and pressing rods 20) that directly move the ram 34, the dimensional and quality requirements of the former are kept away from the latter.

While there is shown and illustrated a present preferred embodiment of the invention, it is to be distinctly understood that the invention is not limited thereto, but may be otherwise variously embodied and practiced within the scope of the following claims.

I claim:

1. A punching machine having a mass forces balancing apparatus, comprising:

a frame (23);

crank shaft means (14, 15, 16) rotatably on the frame and having an eccentric sleeve;

drive means (40, 41) for rotating the crank shaft means;

first rods (1, 2) at opposite ends of the eccentric sleeve, each first rod having one end on the crank shaft for moving the first rod thereby and, extending in one direction, an axially opposite end;

pairs of single arm levers (18, 19) respectively for the first rods, each single arm lever of each pair having one end pivoted to the respective first rod between the ends of the respective first rod and an opposite end;

pivot means (21, 21', 22, 44) on the frame supporting, respectively, the opposite ends of the single arm levers for pivotal movement and movement generally parallel to and transverse to the axes to the first rods;

a ram (34) reciprocably movable on the frame;

pressing rods (20) for the respective single arm levers, each pressing rod having one end pivoted to the respective single arm lever intermediate the ends of the single arm lever and an opposite end pivoted to the ram;

whereby the ram is reciprocated for a punching operation;

second rods (3, 4) respectively associated with the first rods, each second rod having one end on the eccentric sleeve for moving the second rod thereby and, extending in a direction opposite to the direction of the first rods, an opposite end;

pairs of first reversing levers (5, 6) respectively for the second rods, each reversing rod having one end pivoted to the opposite end of the respective second rod and an opposite end, and being pivoted to the frame between the ends thereof;

balancing weights (10, 11) respectively for the first reversing levers, each balancing weight having one end pivoted to the opposite end of the respective first reversing lever and an opposite end; and link rods (30) respectively for the pairs of first reversing levers, each link rod having one end pivoted to the opposite end of the first rod respectively for the second rod for the respective pair of first reversing levers and an opposite end pivoted to the opposite end of the balancing weight of the respective reversing lever.

2. The punching machine according to claim 1, wherein the first rods are forked into separate portions at the one end pivoted to the eccentric sleeve and the respective second rod is between the portions.

3. The punching machine according to claim 2, wherein the pivot of the one end of each of the single arm levers to the first rods between the ends of the first rods comprises a journal pin (17), and further comprising parallel-guiding means for guiding movement of the journal pin by the first rods substantially in parallel with the reciprocation of the ram, the parallel guiding means comprising:
- a second reversing lever (25) having opposite ends, the second reversing lever being pivoted to the journal pin between the opposite ends thereof; and
- first and second parallel-guiding link rods (27, 28), each parallel-guiding link rod having one end pivoted to the frame and an opposite end pivoted to a respective one of the opposite ends of the second reversing lever.

4. The punching machine according to claim 1, wherein the pivot of the one end of each of the single arm levers to the first rods between the ends of the first rods comprises a journal pin (17), and further comprising parallel-guiding means for guiding movement of the journal pin by the first rods substantially in parallel with the reciprocation of the ram, the parallel guiding means comprising:
- a second reversing lever (25) having opposite ends, the second reversing lever being pivoted to the journal pin between the opposite ends thereof; and
- first and second parallel-guiding link rods (27, 28), each parallel-guiding link rod having one end pivoted to the frame and an opposite end pivoted to a respective one of the opposite ends of the second reversing lever.

* * * * *